United States Patent [19]
Pineau

[11] 3,751,024
[45] Aug. 7, 1973

[54] SHOCK AND VIBRATION DAMPER
[76] Inventor: André Lucien Pineau, 12 Rue de Bearn, 92 Saint Cloud, France
[22] Filed: Aug. 13, 1971
[21] Appl. No.: 171,423

[30] Foreign Application Priority Data
Aug. 13, 1970 France .............................. 7029833

[52] U.S. Cl. ............................................. 267/153
[51] Int. Cl. .............................................. F16f 1/34
[58] Field of Search .................... 267/153, 152, 141, 267/131

[56] References Cited
UNITED STATES PATENTS
| | | | |
|---|---|---|---|
| 3,219,305 | 11/1965 | Chartet | 267/153 |
| 2,819,060 | 1/1958 | Neidhart | 267/153 |
| 3,580,560 | 5/1971 | Jarret et al. | 267/153 |

FOREIGN PATENTS OR APPLICATIONS
706,558   3/1954   Great Britain ..................... 267/153

*Primary Examiner*—James B. Marbert
*Attorney*—Holman & Stern

[57] ABSTRACT

Device for damping shocks and vibrations comprising a first member and a second member having a common axis and concentric with this axis. At least one annular series of elastomer elements or at least one toric elastomer element is interposed between the members and surrounds said axis. The members define four faces which confine the elastomer elements or element in all directions. In the unstressed inoperative condition of the device, the element or elements have a curvilinear cross sectional shape. The element or elements may be hollow, solid or cellular.

20 Claims, 12 Drawing Figures

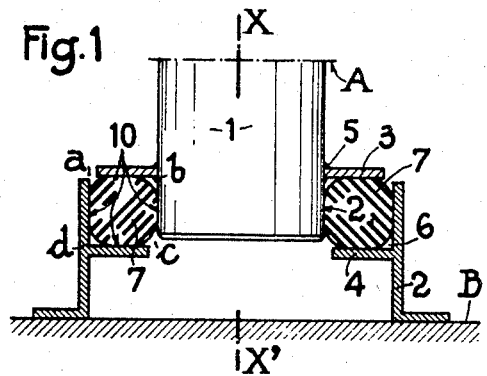
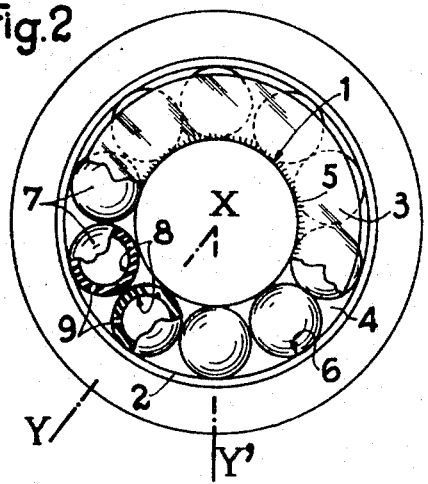
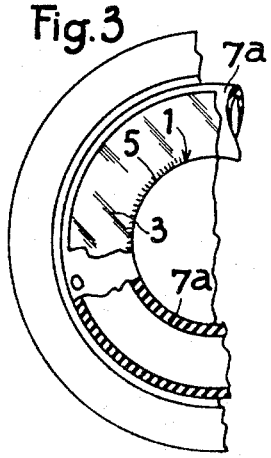
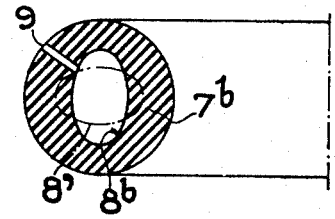
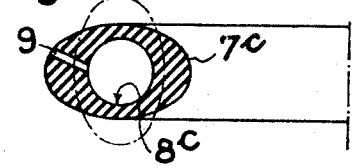
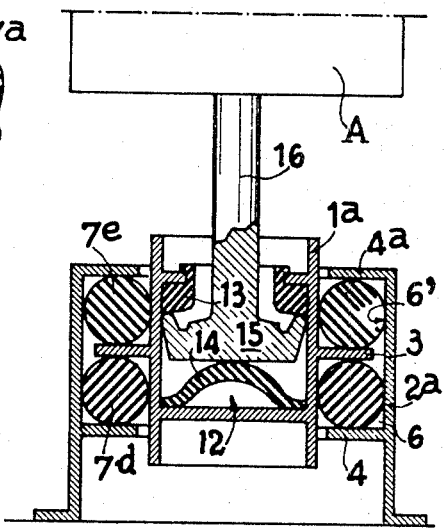

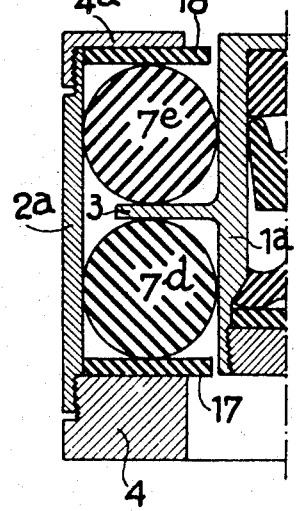
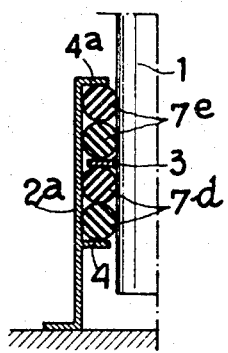
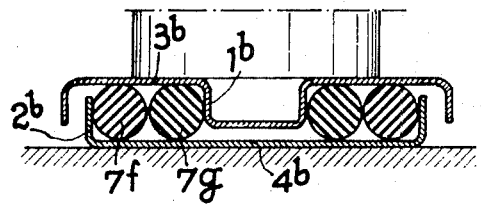
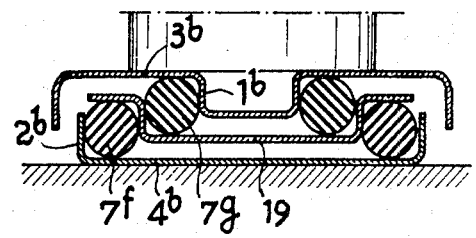
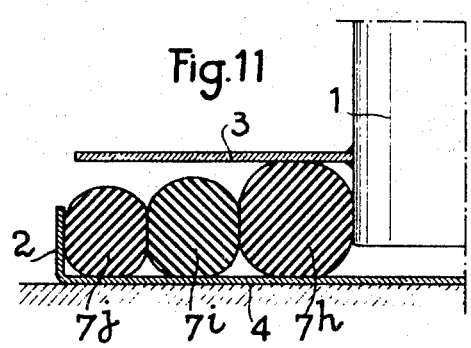
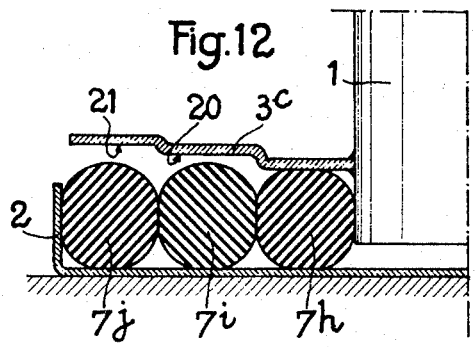

SHOCK AND VIBRATION DAMPER

The present invention relates to the damping or absorption of shocks and vibrations.

Many devices are known which protect structures from shocks and vibrations and comprise deformable rubber elements which may be vulcanized to metal armatures. Usually, the action of these devices is variable, depending on the direction of damping and the suspensions obtained are far from being iso-elastic.

For example, French Pat. No. 1,559,799 discloses an arrangement in which the main damping element is constituted by a hollow elastomer ring which is adapted to absorb the shocks and surrounds a centre element having more particularly an antivibration function. Owing to the vulcanization of each of the lateral faces of the ring, the stiffness or rigidity along the main axis of the suspension is much less than in a transverse plane so that the suspension is especially suitable for damping shock accelerations along this main axis. On the other hand, owing to the metal binding of the lateral walls, the transverse deformability is distinctly less.

Now, this may be a drawback when the operational conditions result in lateral accelerations which are as high as the vertical accelerations. In this case it is desirable, above all when it concerns supporting a delicate or fragile structure, to arrange that the suspension have a lateral stiffness equal to the axial stiffness so that this suspension is perfectly iso-elastic irrespective of the orientation of the shocks.

An object of the invention is to provide an improved iso-elastic shock and vibration damping device.

The device according to invention is adapted to interconnect a suspended mass and a support and comprises in combination, two rigid members having a common axis and concentric with respect to said axis and adapted to be fixed respectively to the suspended mass and to the support, and at least one mass of elastomer product interposed between said members and capable of undergoing large deformations and arranged annularly around said axis and confined in all directions between associated faces of said members so that in at least a number of axial radial planes the elastomer mass is in contact with said faces in four portions of the contour of its section in the corresponding plane, said contour being curvilinear in the free state.

Such a suspension has a stiffness which increases as the elastomer product is deformed under the effect of static or dynamic loads, irrespective of their axial, radial or oblique direction. The stiffness of the suspension is equal, whatever this direction, owing to the annular arrangement of the elastomer mass. The suspension is therefore perfectly iso-elastic, since it is capable of damping or absorbing the shocks or vibrations under the same conditions irrespective of the direction of the disturbing forces.

In one embodiment of the invention, the elastomer product is in the form of at least one set of spherical, ovoid or like-shaped elements disposed in an annular arrangement around the axis.

In another embodiment, the elastomer is in the form of at least one toric element disposed in an annular cavity as defined hereinbefore.

The elastomer element or elements may be solid or hollow and, if hollow, provided with at least one small orifice which avoids the pneumatic effect without, however, diminishing the load capacity.

In either arrangement, the elastomer product may be solid and have a low modulus or cellular with open or closed cells so that it is in all cases of a type having high deformability.

In the case of separate hollow elements, which afford an increased deformation for a given modulus, the deformability can be regulated by varying the inside diameter of the elements, and this deformability may be rendered preferential along a given axis by giving, when molding the elements, and elliptical or like shape to the outer or inner sectional contour of the elements in such a manner as to result in an increased deformability along the chosen axis.

Further features and advantages of the invention will be apparent from the ensuing description with reference to the accompanying drawings.

In the drawings :

FIG. 1 is an axial diametral sectional view of a device according to the invention having spherical elastomer elements;

FIG. 2 is a plan view of the device shown in FIG. 1, with a part cut away, the elastomer elements being shown in the same way as in all the arrangements represented in the other figures for reasons of simplicity, in the shape they have in the free undeformed state ;

FIG. 3 is a partial plan view, with a part cut away, of another embodiment having a single toric elastomer element ;

FIGS. 4 and 5 are radial axial sectional views of other toric elements of utility in the invention ;

FIG. 6 is a diametral axial sectional view of another device according to invention having two annular elastomer masses and a centre complementary antivibration device ;

FIG. 7 is a radial axial sectional view of a modification of the device shown in FIG. 6 ;

FIG. 8 is a radial axial sectional view of another embodiment of the invention ;

FIGS. 9 and 10 are diametral axial sectional views of two arrangements having two elastomer masses arranged in parallel ralation, and FIGS. 11 and 12 are radial axial sectional views of two other embodiments.

In the embodiment shown in FIGS. 1 and 2, the device according to the invention is adapted to interconnect a suspended mass A which may be the centre of vibrations, and a support B. The device comprises a rigid, solid or hollow axial member 1 which transmits the forces and is fixed to the mass A, and a rigid member 2 which receives the forces and is fixed to the support B. The two axial members 1 and 2 having a common longitudinal axis X-X' are provided with transverse flanges 3 and 4. For example, the flange 3 is secured to the member 1 by welding 5 and the flange 4 is integral with the member 2.

The two members and their flanges define by their cylindrical coaxial faces and their opposed plane annular transverse faces an annular square- or rectangular-sectioned cavity 6 centered on the axis X-X'. In this cavity, there is, confined or trapped, an elastomer mass comprising a series of juxtaposed elements 7 of natural or artificial rubber product which is solid or cellular with open or closed cells. The element 7 may be spherical, as shown, or ovoid or ellipsoid, etc.

Depending on the forces to be supported, the elements 7 may be either solid, as shown in FIG. 1, or hollow as those shown in FIG. 2, the cavity 8 of which has a spherical or other shape and communicates with the exterior via at least one small orifice 9.

In this embodiment, in the free undeformed state, the elements 7 having a spherical or like shape have a meridian section which has a curvilinear contour and such that it cannot be completely inscribed in the radial axial section $a\ b\ c\ d$ (FIG. 1) of the cavity 6 whose sides are therefore slightly secant to this meridian section, contrary to the arrangement illustrated in FIG. 2 which was, as explained, adopted to facilitate the drawing. The elements 7 can therefore only enter the cavity 6 subsequent to a slight compression as shown in FIG. 1. The latter shows each element 7 in contact with the four faces surrounding it by four flattened portions 10, the centre points of which are located in groups of four in radial planes X–Y – X–Y' evenly angularly spaced apart.

The device is iso-elastic. It is subjected to, and absorbs or damps, all the forces transmitted by the suspended mass A to the member 1, whatever the direction, which may be between the downward vertical direction X–X' and any transverse radial direction contained in a plane perpendicular to the axis X–X'.

It will be observed that the deformation of the suspension at a given point under the effect of a stress is always the same. This advantage is essential when the conditions of operation of the suspension require maintaining the angular position of the device with high precision.

The deformability of the suspension can be adjusted or regulated to suit the operational conditions. The stiffness can be regulated by one of the following means, taken together or separately :

the chosen modulus of deformability of the elastomer mixture ; this modulus, which is often characterized by the Shore hardness, is chosen in accordance with the conditions of operation of the suspension ;

the nature of the elastomer mixture which may be, as already mentioned, of the compact homogeneous type or of the cellular type having open or closed cells.

Other means may be provided for modifying the curve of deformability as a function of relative displacements. Thus, without modifying the initial moulded shape or the modulus of the elements 7, it is possible to dispose these elements in the cavity 6 by force after modification of the annular cavity 6 defined between the cylindrical faces of the members 1 and 2 and the flanges 3 and 4. For example, if it is desired to achieve a preferential deformability along the main axis X–X' of the suspension (FIG. 1), the available height between the flanges 3 and 4 may be decreased and the distance between the cylindrical faces of the members 1 and 2 increased so as to produce a deformation of the damping elements 7 in accordance with a horizontal elliptical section.

On the other hand, if it is desired to decrease the transverse stiffness, the same parameters can be modified in the opposite direction ; the space between the flanges 3 and 4 is increased and the distance between the cylindrical faces decreased so as to produce a deformation of the damping elements 7 in accordance with a vertical elliptical section.

Instead of a preferential prestressing as before, a prestressing may be produced which is equal in all directions by decreasing to a constant extent throughout the space between the faces defining the cavity 6. This increases the stiffness of the assembly while the suspension remains iso-elastic.

FIG. 3 shows a modification of the invention whereby it is possible to obtain a preferential deformability by replacing the separate damping elements 7 by a toric element $7^a$ which has the same circular section and is solid or hollow. The deformability is less in this case than with separate damping elements. The same modifications as for the separate elements can be adopted with toric elements, namely the elements may be solid, cellular or hollow. Likewise, the same modifications may be adopted in respect of the distance between the concentric members so as to achieve a preferential deformability of the damping element.

Instead of hollow elements 7 or $7^a$ having a constant wall thickness, there may employed elements having an uneven wall thickness, for example as shown in FIG. 4 in which a spherical or toric element $7^b$ has a cavity having an eliptical or like section and a vertical major axis (cavity $8^b$) or a horizontal major axis (cavity 8') or as shown in FIG. 5 in which an element has a circular cavity $8^c$ but an outer face having an elliptical section with a horizontal major axis (element $7^c$) or a vertical major axis (element $7^d$).

The device shown in FIGS. 1 and 3 is adapted to be subjected only to forces exerted downwardly or laterally, but the device according to invention can also be arranged to be operative in both directions in the axial and in the lateral and oblique directions. An embodiment is shown in FIG. 6 in which there are provided two cavities 6 and 6' on each side of the flange 3 of the member or armature $1^a$, the member or armature $2^a$ having flanges 4 and $4^a$. Thus two annular elastomer masses are provided in the form of two toric elements $7^b$, $7^e$ or in the form of two annular rows of individual juxtaposed damping elements.

It will be observed that in the embodiment shown in FIG. 6, the member or armature $1^a$ is not directly connected to the suspended mass A, but connected thereto by an auxiliary inner damping device 12 of known type having elastomer masses 13, 14 surrounding the head 15 of a rod 16.

In order to permit maximum deformability of the damping elements $7^d$, $7^e$ under the effect of shocks there may be formed between the flanges 3, 4,$4^a$ and the members $1^a$ and $2^a$ a space at least equal to the deformation of these elements under the effect of the shock. In some cases, the bearing face for the damping elements on the flanges is liable to be insufficient to avoid deterioration of the damping elements when the shock occurs. In this case, additional washers 17, 18 (FIG. 7) may be provided which are composed of elastomer and are deformable under the effect of violent shocks but maintain a sufficient bearing or support face for the elements $7^d$, $7^e$ so that the latter are not damaged.

If desired there may be provided on one side or on each side of the flange 3 which is integral with the armature or centre member 1 or $1^a$, a plurality of elastomer elements which are superimposed and/or parallel to each other.

Thus in the embodiment shown in FIG. 8, two pairs of superimposed elastomer elements $7^d$ or $7^3$ are provided ; the number of superimposed elements located on each side of the flange 3 may be, or may not be, equal.

In the embodiment shown in FIG. 9, two elements 7$^f$ and 7$^g$ are disposed in parallel concentric relation between the armatures 1$^b$ and 2$^b$ and their flanges 3$^b$ and 4$^b$, these flanges forming for example a solid end wall.

In the embodiment shown in FIG. 10, a press-formed dividing member 19 is interposed between the two elements 7$^f$ and 7$^g$.

As mentioned before, the suspension device according to invention affords an increasing stiffness which renders it particularly suitable for damping or absorbing large-amplitude vibrations and shocks. Certain service conditions stipulated in some design specifications may require that the increase in this stiffness be delayed at the start of the travel. This is the case in particular when the mass to be suspended is liable to be subjected to high static accelerations combined with dynamic vibratory accelerations.

This can be achieved by the following means taken together or separately :

there may be employed in parallel damping elements 7$^h$, 7$^i$, 7$^j$ (FIG. 11) having different diameters so that they are compressed between the flanges 3 and 4 in succession as the stresses increase ;

there may also be employed a plurality of damping elements 7$^i$, 7$^j$, 7$^h$ which have the same diameter but are in combination with an arrangement in which at least one of the flanges, for example flange 3$^c$, has stepped portions 20, 21 (FIG. 12) which define a space of varying size for the deformation of each of the damping elements ; the latter are thus stressed progressively or in succession as they come in contact with the stepped portions of the flange instead of simultaneously. In this way, the stiffness is considerably reduced at the start of the travel of the suspension armature.

The same result may also be obtained by arranging the differential stepped portions side-by-side in the case of a single annular arrangement of elements or a plurality of superimposed annular arrangements ; or by arranging the differential stepped portions in the circular armatures or members 1 and 2 instead of in the flanges.

Having now described my invention what I claim as new and desire to secure by Letters Patent is :

1. A device for damping shocks and vibrations adapted to interconnect a suspended mass and a support, comprising in combination means defining a first rigid member and means defining a second rigid member, said member having a common axis and being concentric with said axis and for fixing respectively to the suspended mass and the support, and elastically yieldable means composed of elastomer interposed between said members and capable of undergoing large deformations and arranged annularly around said axis, said two members defining faces which confine said yieldable means in all directions, said yieldable means having a cross-sectional contour in radial planes containing said axis which contour is in contact with said faces in four parts of said contour, said contour being curvilinear in an unstressed inoperative condition of the device.

2. A device as claimed in claim 1, wherein the elastically yieldable means comprises a set of individual elastomer elements which have a curvilinear outer contour and are arranged in an annular assembly of said elements around said axis.

3. A device as claimed in claim 2, wherein said outer contour is spherical in an unstressed inoperative condition of the elements.

4. A device as claimed in claim 2, wherein said outer contour is ovoid in an unstressed inoperative condition of the elements.

5. A device as claimed in claim 1, comprising a plurality of said elastically yieldable means composed of elastomer interposed between said members.

6. A device for damping shocks and vibrations adapted to interconnect a suspended mass and a support, comprising in combination means defining a first rigid member and means defining a second rigid member, said members having a common axis and being concentric with said axis and for fixing respectively to the suspended mass and the support, a set of a plurality of individual elastomer elements capable of undergoing large deformations and arranged in an annular assembly of said elements around said axis and interposed between said members, said two members defining two concentric axially extending faces and two transverse annular faces perpendicular to said axis, said four faces confining said elements, each of said elements having a cross-sectional outer contour in a radial plane containing said axis which contour is in contact with said faces in four parts of said contour, said contour being curvilinear in an unstressed inoperative condition of the device.

7. A device for damping shocks and vibrations adapted to interconnect a suspended mass and a support, comprising in combination means defining a first rigid member and means defining a second rigid member, said members having a common axis and being concentric with said axis and for fixing respectively to the suspended mass and the support, a toric elastomer element capable of undergoing large deformations and interposed between said two members, said two members defining two concentric axially extending faces and two transverse annular faces perpendicular to said axis, said four faces confining said toric element, said toric element having a cross-sectional outer contour in radial planes containing said axis which contour is in contact with said faces in four parts of said contour, said contour being curvilinear in an unstressed inoperative condition of the device.

8. A device as claimed in claim 6, wherein each of said elastomer elements comprises an inner cavity and means defining an orifice which puts the cavity in communication with the exterior.

9. A device as claimed in claim 7, wherein said toric element comprises an annular cavity and means defining an orifice which puts said cavity in communication with the exterior.

10. A device as claimed in claim 1, wherein said elastically yieldable means has a circular cross-sectional shape in radial planes containing said axis.

11. A device as claimed in claim 1, wherein said elastically yieldable means has a cross-sectional size in radial planes containing said axis which has a dimension in a direction parallel to said axis which is different from the dimension in a direction perpendicular to said axis.

12. A device as claimed in claim 1, comprising means defining a radially extending flange on one of said members and two of said elastically yieldable means composed of elastomer, each of which means is located on each side of said flange.

13. A device for damping shocks and vibrations adapted to interconnect a suspended mass and a support, comprising in combination means defining a first rigid member and means defining a second rigid member, said members having a common axis and being concentric with said axis and for fixing respectively to the suspended mass and the support, and two elastically yieldable means composed of elastomer and in adjoining relation to each other and interposed between said members and capable of undergoing large deformations and arranged annularly around said axis, said two members defining faces which confine said two elastically yieldable means in all directions, each of said yieldable means having a cross-sectional contour in radial planes containing said axis which is curvilinear in an unstressed inoperative condition of the device, said contours of each of said yieldable means being in contact in two parts of the contour with two of said faces of the two members and being in contact in one part of the contour with one of said members and being in contact in another part of the contour with the adjoining elastically yieldable means.

14. A device as claimed in claim 13, wherein said two elastically yieldable means are in axially adjoining relation to each other.

15. A device as claimed in claim 13, wherein said two elastically yieldable means are in radially adjacent relation to each other.

16. A device as claimed in claim 15, comprising an annular member interposed between each yieldable means and floating with respect to said first member and second member.

17. A device for damping shocks and vibrations adapted to interconnect a suspended mass and a support, comprising in combination means defining a first rigid member and means defining a second rigid member, said members having a common axis and being concentric with said axis and for fixing respectively to the suspended mass and the support, and two elastically yieldable means composed of elastomer and in adjoining relation to each other and interposed between said members and capable of undergoing large deformations and arranged annularly around said axis, said two members defining faces which confine said two elastically yieldable means in all directions, each of said yieldable means having a cross-sectional contour in radial planes containing said axis which is curvilinear in an unstressed inoperative condition of the device, said contours of each of said yieldable means being capable of coming in contact in two parts of the contour with two of said faces of the two members and being in contact in one part of the contour with one of said members and being in contact in another part of the contour with the adjoining elastically yieldable means, said two yieldable means being at two different distances from said two faces of said members so that said yieldable means come into action in succession, said distance being nil for one of said yieldable means in an unstressed inoperative condition of the device.

18. A device as claimed in claim 8, wherein each element has a wall defining said cavity, said wall having a thickness in a direction parallel to said axis which is different from the thickness of the wall in a direction perpendicular to said axis.

19. A device as claimed in claim 7, wherein said toric element has a wall defining said cavity, said wall having a thickness in a direction parallel to said axis which is different from the thickness of the wall in a direction perpendicular to said axis.

20. A device as claimed in claim 17, further comprising a third of said elastically yieldable means interposed between and adjoining said two yieldable means, said third elastically yieldable means being at a distance from said two faces of said members which is different from said two different distances.

* * * * *